Dec. 11, 1962 W. J. E. SAUERBREY 3,067,597
OVER-RIDING SAFETY COUPLING FOR SPINDLE
OF POWER-DRIVEN TOOL
Filed Sept. 27, 1961 2 Sheets-Sheet 1
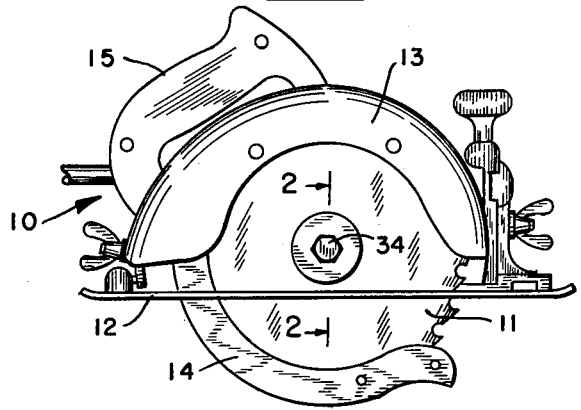
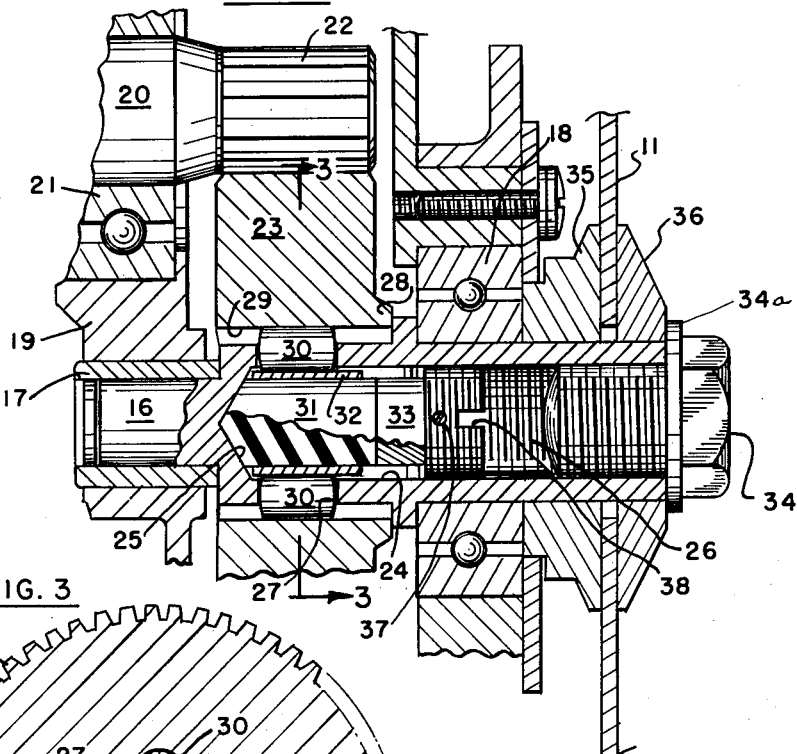
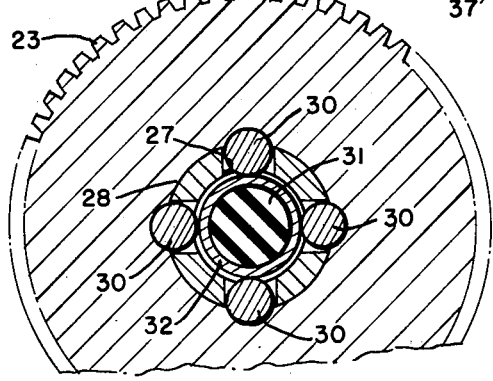
INVENTOR
WILMER J.E. SAUERBREY
BY *Leonard Bloom*
ATTORNEY

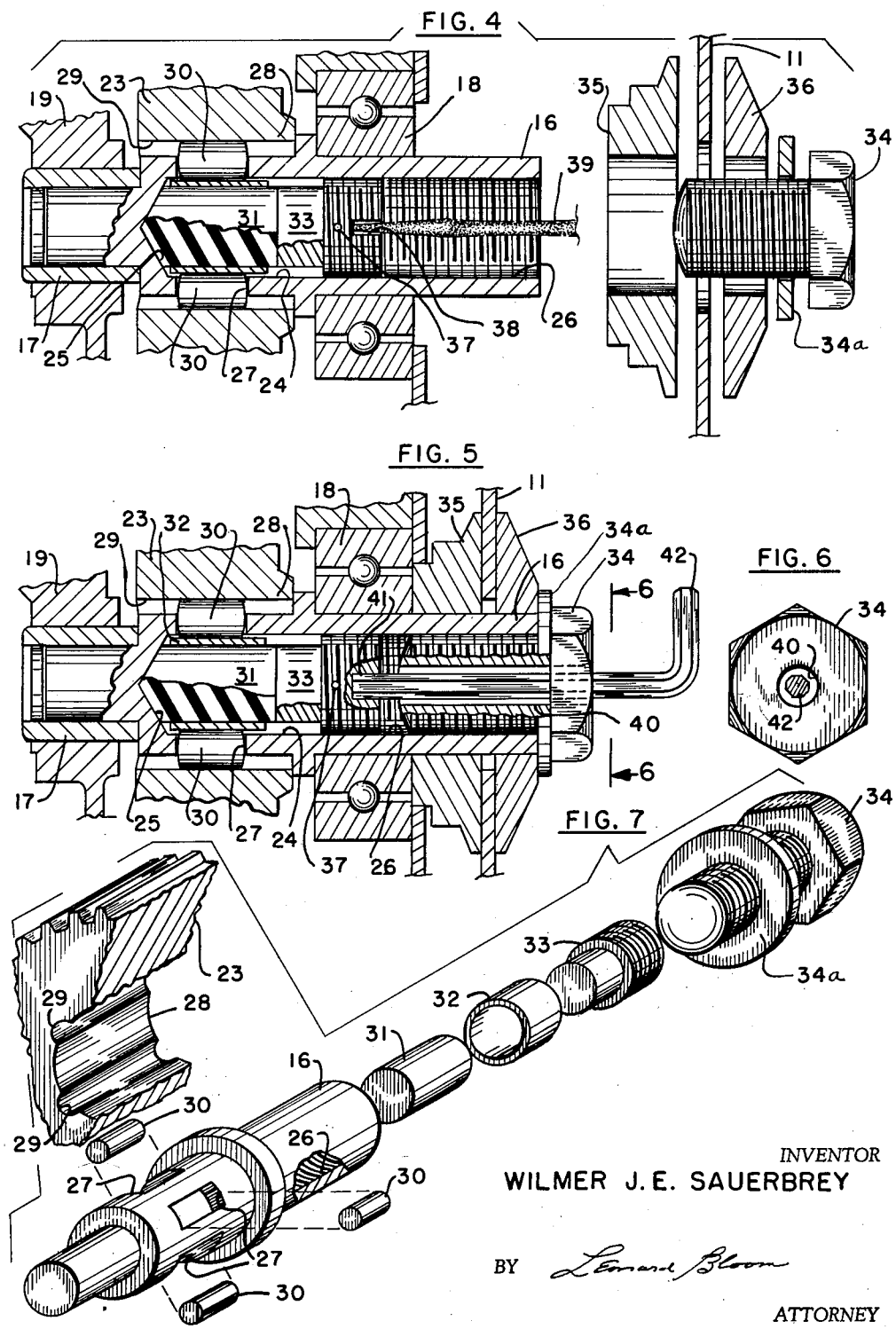

United States Patent Office 3,067,597
Patented Dec. 11, 1962

3,067,597
OVER-RIDING SAFETY COUPLING FOR SPINDLE OF POWER-DRIVEN TOOL
Wilmer J. E. Sauerbrey, Towson, Md., assignor to The Black and Decker Manufacturing Company, Towson, Md., a corporation of Maryland
Filed Sept. 27, 1961, Ser. No. 141,125
9 Claims. (Cl. 64—29)

The present invention relates to an adjustable resilient coupling means for the spindle of a power-driven tool, and more particularly, to such means whereby a drive member will be decoupled from the spindle whenever the spindle encounters sufficient resistance to further rotation thereof.

In the prior art relating to power-driven tools, the spindle of the tool is adapted to drive a suitable cutting or work-engaging element, such as a blade; and occasionally during the operation of the tool, the cutting element may encounter an unusual amount of resistance in the workpiece, thus temporarily stopping the cutting element. Under such circumstances, an undue strain or shock is imparted to the spindle and to the drive mechanism of the tool, while the tool itself may be quite difficult, if not impossible, to control. Not only is the strain harmful to the drive mechanism of the tool, but even more importantly, a hazardous situation is created which may cause an injury to the user. This hazardous situation is especially pronounced where the user is only partially experienced in the operation of tool, and hence does not de-energize the tool quickly and safely.

Accordingly, it is an object of the present invention to alleviate the aforementioned difficulties by providing an overriding anti-friction safety coupling for the spindle of a power-driven tool.

It is another object of the present invention to provide a resilient coupling between the spindle and a drive member of a power-driven tool, wherein torsional vibrations or impacts will be continuously absorbed during the operation of the tool.

It is yet another object of the present invention to provide an adjustable coupling between the spindle and the drive member of a power-driven tool, wherein the coupling may be adjusted from an override torque to a non-override torque.

It is yet still another object of the present invention to provide, between the spindle and the drive member of a power-driven tool, an adjustable coupling that includes anti-friction clutch elements and whose operation is not dependent upon erratic frictional forces exerted between wearing surfaces.

It is a further object of the present invention to provide an adjustable coupling between the spindle and the drive member of a power-driven tool, wherein the coupling is axially adjustable through the center of the spindle.

It is a still further object of the present invention to provide an adjustable coupling that may be implemented between the spindle and the drive member of an existing power-driven tool without necessitating an expensive redesign of the tool and its associated housings.

It is a yet still further object of the present invention to provide, for use on the spindle of a power-driven tool, an adjustable coupling that is relatively-inexpensive and is inherently rugged for reliable and continuous service.

In accordance with the teachings of the present invention, there is provided for use in a power-driven tool having a housing, and further having a spindle journaled in the housing and a drive member rotatably mounted on the spindle, an adjustable coupling means between the spindle and the drive member. The adjustable coupling means includes clutch means between the spindle and the drive member, and the clutch means includes at least one anti-friction clutch element. A resilient member is provided to exert a pressure on the clutch means; and means are further provided to vary the pressure exerted by the resilient member on the clutch means, whereby the coupling of the drive member to the spindle is made adjustable, and whereby the drive member will be decoupled from the spindle whenever the spindle encounters sufficient resistance to further rotation thereof.

These and other objects of the present invention will become apparent from a reading of the following specification, taken in conjunction with the enclosed drawings, in which:

FIGURE 1 is a side elevational view of a typical power-driven tool in which the teachings of the present invention may find particular utility;

FIGURE 2 is a view taken along the lines 2—2 of FIGURE 1, showing the spindle, the drive member rotatably mounted on the spindle, and the adjustable resilient coupling means between the spindle and the drive member;

FIGURE 3 is a view taken along the lines 3—3 of FIGURE 2, showing the plurality of anti-friction clutch elements;

FIGURE 4 is a view corresponding to a portion of FIGURE 2, but showing the coupling means in the process of being adjusted;

FIGURE 5 is a view corresponding to that of FIGURE 4, but showing an alternate construction and its particular method for adjusting the coupling means;

FIGURE 6 is a view taken along the lines 6—6 of FIGURE 5; and

FIGURE 7 is an exploded perspective view of the structure of FIGURE 2.

With reference to FIGURE 1, there is illustrated a portable electric circular saw 10 having a blade 11, work-engaging shoe 12, conventional upper guard 13, telescoping lower guard 14, and a switch handle 15; and it will be appreciated that the saw 10 is conventional and is merely illustrative of a particular power-driven tool in conjunction with which the teachings of the present invention may be applied, it being understood that the present invention is applicable to power-driven tools generally.

With reference to FIGURES 2, 3, and 6, the saw 10 is provided with a spindle 16 journaled fore and aft, respectively, in bearings 18 and 17 retained in the housing 19 of the saw 10. The saw 10 is further provided with an armature shaft 20 journaled in bearing 21 in the housing 19; and it will be noted that the respective axes of the spindle 16 and the armature shaft 20, preferably but not necessarily, are parallel to each other. A pinion 22 is formed on the end of the armature shaft 20, and a single-reduction gear 23 is rotatably mounted on the spindle 16 and meshes with pinion 22. The spindle 16 has a blind axial bore 24 terminating in a closed internal wall 25 of the spindle 16, and a portion of the blind axial bore 24 is provided with internal threads 26. The spindle 16 is provided with a plurality of circumferentially-spaced openings 27, while the gear 23 has a hub portion 28 which is provided with a corresponding plurality of circumferentially-spaced internal pockets 29. The pockets 29 open on to the spindle 16 and are axially-aligned with the openings 27 of the spindle 16. A plurality of anti-friction clutch elements comprising rollers 30 are received respectively between the openings 27 and the pockets 29. A resilient core 31 is received within the blind axial bore 24 of the spindle 16 (in axial alignment with the rollers 30); and preferably, but not necessarily, a relatively-thin spring-steel cylindrical shell 32 is interposed between the resilient core 31 and the rollers 30. An adjusting screw 33 is provided axially adjacent of the resilient core 31 and adapted to axially compress the resilient core 31 against the closed internal wall 25 of the spindle 16, and a locking bolt 34 is received within the remaining portion of the spindle 16. A washer 34a is interposed between spindle 16 and the head of the locking bolt 34. An inner clamp washer 35 and an outer clamp washer 36, in combination with the locking bolt 34, secure the blade 11 to the spindle 16. Moreover, the adjusting screw 33 is provided with a suitable anti-vibration pellet 37 to prevent the adjusting screw 33 from being inadvertently shifted during the operation of the saw 10, and the adjusting screw 33 is further provided with a kerf 38 for a purpose hereinafter to be explained.

With reference to FIGURE 4, the operation of the present invention may be more clearly understood. The locking bolt 34 and outer clamp washer 36 have been removed, and a suitable tool, such as screwdriver 39, is inserted within the bore 24 of spindle 16 so as to engage the kerf 38 of adjusting screw 33. The inner clamp washer 35 as well as the blade 11 have been shown in FIGURE 4 as removed from the saw 10; however, it will be understood that for purposes of adjusting the mechanism of the present invention, only the outer clamp washer 36 and locking bolt 34 need be removed while the inner clamp washer 35 and blade 11 may remain in position on the saw 10.

Thereafter, by turning the screwdriver 39 in the kerf 38 of adjusting screw 33, the resilient core 31 may be axially compressed against the closed internal wall 25 of the spindle 16, thus reducing the resiliency of the core 31 and causing it to exert a greater (or a less) radial pressure on the rollers 30. Hence, at a particular setting of the adjusting screw 33, if and when the blade 11 encounters a sufficient resistance in the workpiece to create a bind on the blade 11 and to temporarily stop the spindle 16, the rollers 30 will ride out of their respective pockets 29 against the predetermined counteracting force of the resilient core 31; and thus the gear 23 will override the spindle 16, with the pinion 22 continuing to engage and drive the gear 23, but with the gear 23 being decoupled from the spindle 16.

Consequently, the torque at which the rollers 30 will ride out of the pockets 29 of the gear 23, thus decoupling the gear 23 from the spindle 16 and causing a slippage therebetween, may be adjusted within fairly close limits. Moreover, the coupling mechanism has the facility of being adjusted from a minimum or loose position of "slippage" approaching a zero torque, wherein the gear 23 may be decoupled from the spindle 16 by a mere hand turning of the spindle 16, to a maximum degree of coupling amounting to substantially a "lock-up" in the coupling mechanism. At all instances, however, even when a "lock-up" setting is effected, the coupling mechanism including the resilient core 31 will provide a good degree of absorption for torsional vibrations and stresses which would otherwise cause at least a modicum of wear or damage to the working components, such as the gear 23 and the pinion 22.

With reference to FIGURE 5, a modification of the present invention is illustrated. Here, the locking bolt 34 is provided with a longitudinal through opening 40, and the adjusting screw 33 is provided with a hexagonal socket 41 in lieu of kerf 38; thus a suitable tool, such as an Allen-type of hexagonal wrench 42 may be inserted through the opening 40 in the locking bolt 34 to engage the hexagonal socket 41 so as to set the adjusting screw 33 externally of the saw 10 and without the necessity for previously removing the locking bolt 34 and outer clamp washer 36.

Obviously many modifications may be made without departing from the basic spirit of the present invention. For example, it will be appreciated by one skilled in the art that a pulley and belt drive may be substituted for the gear 23 and pinion 22, yet fall within the purview of a "drive member" rotatably mounted upon a spindle; and moreover, it will be further appreciated that the "drive member" and the "spindle" may be anywhere within the overall drive mechanism of the power-driven tool. Furthermore, a plurality of balls could be utilized as the anti-friction clutch elements, in lieu of the rollers 30. Accordingly, it will be understood that within the scope of the appended claims, the invention may be practiced other than has been specifically described herein.

I claim:

1. In a power-driven tool, the combination of a housing, a spindle journaled in said housing, said spindle having an externally-accessible blind axial bore and further having a closed internal wall adjacent said blind axial bore, a gear rotatably mounted upon said spindle within said housing, said gear having a series of circumferentially-spaced internal pockets opening on said spindle, said spindle having a corresponding series of circumferentially-spaced openings axially aligned with said pockets of said gear, clutch elements retained in said series of openings in said spindle and protruding radially therethrough to be received within said pockets of said gear, a resilient core within said blind axial bore of said spindle, said core being disposed against said closed internal wall and being axially aligned with said clutch elements, means to axially compress said resilient core against said closed internal wall of said spindle, thereby decreasing the resiliency of said core and creating greater radial pressure on said clutch elements in said pockets, whereby the coupling of said gear to said spindle is made adjustable, and whereby said gear will be decoupled from said spindle when said spindle encounters sufficient resistance to further rotation thereof.

2. The combination according to claim 1, wherein said means to axially compress said resilient core against said closed internal wall of said spindle comprises an externally-accessible adjusting screw within said blind axial bore of said spindle, said adjusting screw being axially adjacent to said resilient core and pressing said core against said closed internal wall, and said blind axial bore being provided with threads for engagement with said adjusting screw.

3. The combination according to claim 2, wherein said spindle has a portion protruding externally of said housing, in combination with a saw blade and means including a locking bolt to secure said saw blade to said protruding portion of said spindle, said locking bolt being received within said threaded bore of said spindle, whereby said locking bolt may be removed, thereby allowing said adjusting screw to be adjusted externally of said housing.

4. The combination according to claim 3, wherein said locking bolt has a longitudinal through opening therein, thereby allowing a tool to be inserted through said locking bolt to engage said adjusting screw without removing said locking bolt.

5. The combination according to claim 2, wherein a relatively-thin spring shell is interposed between said resilient core and said clutch elements.

6. The combination according to claim 2, wherein said clutch elements comprise a series of rollers.

7. In a power-driven tool, the combination of a housing, an armature shaft journaled in said housing, a pinion on said armature shaft, a spindle journaled in said housing along an axis parallel to said armature shaft, a single-reduction gear rotatably mounted on said spindle and meshing with said pinion, clutch means including a plurality of anti-friction clutch elements between said gear and said spindle, resilient means within said spindle and exerting an outward radial pressure on said clutch elements, and means to compress said resilient means axially of said spindle to thereby vary the radial pressure of said resilient means on said clutch elements, whereby the coupling of said gear to said spindle is made adjustable, and whereby said gear will be decoupled from said spindle whenever said spindle encounters sufficient resistance to further rotation thereof.

8. In a power-driven tool, the combination of a housing, a spindle journaled in said housing, a drive member rotatably mounted on said spindle, and adjustable coupling means between said spindle and said drive member, said adjustable coupling means comprising means forming a recess in said spindle, and further forming at least one opening in said spindle, said opening being radially intermediate said recess in said spindle and said drive member, and said opening communicating said recess in said spindle with said drive member, a clutch element within said opening, a resilient member within said recess and exerting on outward radial pressure on said clutch element, and means to compress said resilient member axially of said spindle to thereby increase the radial pressure exerted by said resilient member on said clutch element, whereby the coupling of said drive member to said spindle is made adjustable, and whereby said drive member will be decoupled from said spindle whenever said spindle encounters sufficient resistance to further rotation thereof.

9. In a power-driven tool, the combination of a housing, a spindle journaled in said housing, a drive member having a hub portion rotatably mounted on said spindle, and adjustable coupling means between said drive member and said spindle, said adjustable coupling means comprising means forming a plurality of circumferentially-spaced internal pockets in said hub portion of said drive member, said pockets opening on said spindle, said spindle having a corresponding plurality of circumferentially-spaced openings axially aligned with said pockets in said hub portion of said drive member, clutch elements disposed between said pockets in said drive member and said respective openings in said spindle, said spindle having a hollow portion axially aligned with said clutch elements, and said spindle further having a closed wall portion axially adjacent to said hollow portion, a resilient member disposed in said hollow portion of said spindle and against said closed wall portion thereof, said resilient member exerting an outward radial pressure on said clutch elements, and means to axially compress said resilient member against said closed wall portion of said spindle, thereby decreasing the resiliency of said resilient member and creating greater radial pressure on said clutch elements in said pockets.

References Cited in the file of this patent

UNITED STATES PATENTS

| | | |
|---|---|---|
| 2,342,540 | Hale | Feb. 22, 1944 |
| 2,441,038 | Siesel | May 4, 1948 |
| 2,668,426 | Hoover | Feb. 9, 1954 |
| 2,758,457 | Meyer | Aug. 14, 1956 |
| 2,881,602 | Baker et al. | Apr. 14, 1959 |
| 2,960,852 | Schroter et al. | Nov. 22, 1960 |
| 2,983,121 | Naas | May 9, 1961 |